No. 32,971.  A. ADAMS.  PATENTED AUG. 6, 1861.
CORN SHELLER.

Witnesses.  Inventor.

UNITED STATES PATENT OFFICE.

AUGUSTUS ADAMS, OF SANDWICH, ILLINOIS.

CORN-SHELLER.

Specification forming part of Letters Patent No. 32,971, dated August 6, 1861; Reissued March 20, 1866, No. 2,205.

*To all whom it may concern:*

Be it known that I, AUGUSTUS ADAMS, of Sandwich, in the county of Dekalb and State of Illinois, have invented a new and useful Improvement in Corn-Shellers; and I do hereby declare that the following is a full, clear, and exact description of the same, reference being had to the annexed drawing, making a part of this specification, and to the letters of reference marked thereon.

The object of this invention is to shell corn; and it consists in providing an apron by which the ears of corn will be taken from a hopper and arranged longitudinally, and thus delivered into the throat or feed spouts of the shelling wheels. And it further consists in furnishing the said throat or feed spout with an auxiliary shaft by which the choking, that so often requires the special attention of the attendant, will be obviated; and it also includes a cob rake or carrier constructed entirely of wire, and without flat surfaces on which the grains of corn may be lodged and carried with the cobs from the machine.

To enable others skilled in the art to make and use my machine I will proceed to describe its construction and operation.

Figure 1:
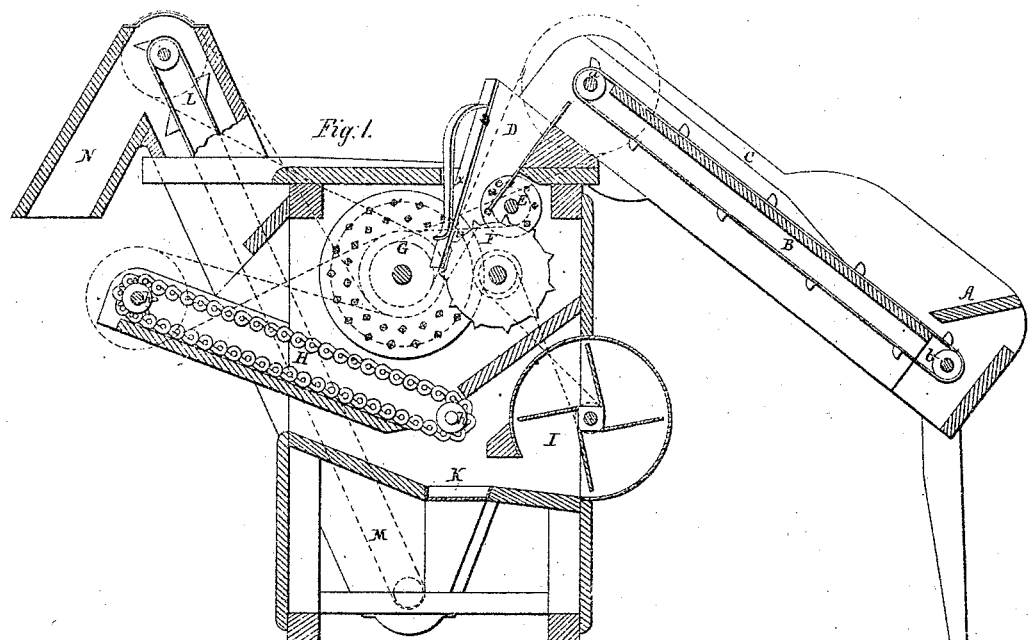
Figure 2:
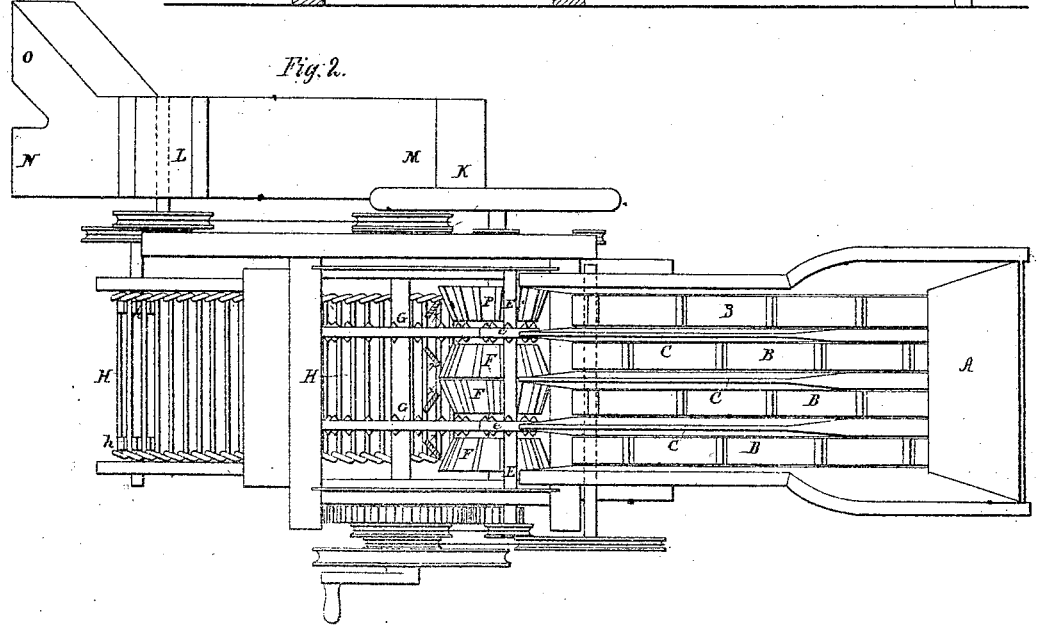

Figure 1 of the drawing represents a sectional elevation of my improved corn sheller designed to shell four ears of corn simultaneously; and Fig. 2 is a plan of the same with the top covering removed to show the interior.

A is a hopper or inclined shelf upon which the ears may be thrown without regard to any special arrangement. There are four endless belts or aprons B, passing over suitable pulleys *a b*, and provided with cleats placed apart but little more than the length of an ordinary cob. Between the belts are partitions C which have flat tops, or upper edges, at the ends nearest the hopper, and rise with beveled edges above the level of the aprons from about midway the length of the aprons to the upper ends that lead to the throats D of the shellers. A single wide belt provided with short, beveled sections may replace the four separate narrow ones.

E is an auxiliary shaft provided with spurred wheels *e e* in the throats of the feed spouts.

F and G are the conical and spurred wheels constituting the shellers. In small machines the corn is fed to the shellers endwise by hand; and in self-feeding machines of the ordinary construction much difficulty is often experienced by the jamming of the ears in the spouts, in which therefore, the corn accumulates until the machine has been stopped, or at least the feeding portion of it, and the throats cleared by the attendant. The office of the auxiliary shaft F is to obviate this objection by catching the corn in the spouts and thrusting it down to the shellers; and although I have preferred to use the shaft with wheels that may also serve partially as shellers and placed as shown in the drawing, yet it is manifest that it will not depart from the nature of this feature of my invention if these wheels should be replaced with any sort of burs, ribs or spokes serving to keep the throats or spouts from being choked.

The springs $x\ x$ that press the corn in contact with the shelling wheels are represented in the plan in section only. The cob "rake" or carrier H is composed entirely of wire; the ends of the several ribs of which are formed into hooked links by which they are connected to form an endless belt working over the pulleys *h h*. The blast from the fan I is delivered under the lower end of the cob carrier and passes from the machine under the plane over which the rake traverses.

K is an inclined spout delivering the shelled corn into an elevator L M constructed in the ordinary manner with an endless belt and cups and delivering the grain to a spout from which it may be bagged or conveyed into bins. The drawing represents a double delivery spout consisting of two branches N and O by which the bags or barrels may be alternately filled without stopping the machine or accumulating the grain in the elevator. The drawing illustrates the character of the frame and the gearing which I prefer to employ, and the direction of the belting is represented by red lines.

When my machine is in operation the ears of corn are thrown upon the shelf A, whence they are taken by the belts B, B, and arranged by the action of the beveled edges C and delivered longitudinally to the spouts D; they are there seized by the wheels *e* which prevent their jamming together in the throat of the spout, and are thrust between the springs $x$ and the shelling wheels F and G by which the corn is shelled from the cobs. The cobs fall upon the rake H and are carried out of the machine; and the corn falls through the open wire work of the rake, and the current of air from the fan, into the spout K that delivers it to the elevator L M by which it is raised a sufficient height to be barreled or sacked at the spouts N O.

I claim as my invention and desire to secure by Letters Patent—

1. The apron feeders B B, constructed substantially as described, with the beveled partitions C C for the purpose of delivering the ears of corn longitudinally to the spouts.

2. The auxiliary shaft E placed in the throat of the feed spouts, in the manner described and for the purpose specified.

3. The construction of the wire cob rake or carrier H as described, that it may have no flat surfaces upon which the corn may be lodged.

AUGUSTUS ADAMS.

Witnesses:
C. E. GRAY,
JOHN ZENGELER.